United States Patent [19]

Czarnowski

[11] Patent Number: 4,768,270

[45] Date of Patent: Sep. 6, 1988

[54] INSTALLATION TOOL FOR HELICAL COIL INSERTS

[75] Inventor: Leonard J. Czarnowski, Torrance, Calif.

[73] Assignee: Rexnord, Inc., Torrance, Calif.

[21] Appl. No.: 942,489

[22] Filed: Dec. 16, 1986

[51] Int. Cl.[4] ............ B23P 19/04

[52] U.S. Cl. ............ 29/240.5; 29/227

[58] Field of Search ............ 29/240.5, 227

[56] References Cited

U.S. PATENT DOCUMENTS

| | | | |
|---|---|---|---|
| 2,390,545 | 12/1945 | Lang . | |
| 2,586,805 | 2/1952 | Forster . | |
| 2,839,823 | 6/1958 | Brancato | 29/240.5 |
| 2,855,661 | 10/1958 | Forster | 29/240.5 |
| 3,093,895 | 6/1963 | Eddy | 29/240.5 |
| 3,111,751 | 11/1963 | Eddy . | |
| 3,579,793 | 5/1971 | Williams et al. | 29/240.5 |
| 3,686,915 | 8/1972 | Miller et al. . | |
| 4,172,314 | 10/1979 | Berecz et al. | 29/240.5 |
| 4,528,737 | 7/1985 | Cosenza et al. . | |
| 4,553,302 | 11/1985 | Cosenza et al. . | |
| 4,553,303 | 11/1985 | Yamamoto . | |
| 4,563,119 | 1/1986 | Cosenza . | |

*Primary Examiner*—Frederick R. Schmidt
*Assistant Examiner*—Judy J. Hartman
*Attorney, Agent, or Firm*—Pretty, Schroeder, Brueggemann & Clark

[57] ABSTRACT

A tool for use in automatically installing a helical coil insert to a preselected depth in a tapped hole formed in a workpiece. The tool includes a tubular tool body carrying an insert near its lower end, and a mandrel in treadedly received in the tool body for engaging the insert and rotatably advancing it into the tapped hole. An adjusting sleeve encircles the mandrel and is threaded to a selected position in the tool body, to serve as a stop for further advancement of the mandrel, thereby controlling the depth to which the insert is installed. The sleeve's position can be adjusted quickly and conveniently without the need for removing the mandrel from the tool body.

8 Claims, 3 Drawing Sheets

INSTALLATION TOOL FOR HELICAL COIL INSERTS

BACKGROUND OF THE INVENTION

This invention relates generally to tools for installing helical coil inserts into tapped holes, and, more particularly, to tools having means for adjusting the depths to which such inserts are installed.

Helical coil inserts are commonly installed into tapped holes of a workpiece such that threaded fasteners, e.g., screws, thereafter can be held more securely. The inserts are frequently installed in relatively soft materials such as aluminum, to improve the gripping of threaded fasteners made of relatively hard materials such as various steel alloys.

Helical coil inserts of this kind are usually installed by compressing them into a smaller diameter and then rotatably threading them into the tapped holes. Once installed, the inserts expand from their compressed diameters and thereby press radially outwardly against the tapped holes and are held securely in place.

Tools for installing the helical coil inserts are typically driven by an air motor and include a tubular tool body having a threaded opening extending along its axis and having means at one end for carrying an insert. A mandrel is received within the threaded opening and is rotatably advanced by the air motor into engagement with the insert. Further advancement of the mandrel forces the insert through a prewinder, which reduces the insert's diameter, and from there into a tapped hole in an adjacent workpiece.

The insertion depth of the helical coil wire insert is controlled by limiting the distance to which the mandrel can be advanced. Typically, this has been accomplished using a sleeve of a desired length which is positioned between the tubular tool body and a flange on the mandrel. In order to change the insert's installation depth, the mandrel had to be removed from the tool body and a different-length sleeve or spacer put in position around the mandrel. An exemplary tool of this kind is shown in U.S. Pat. No. 3,111,751 to Eddy.

The need to remove the mandrel from the tool body in order to adjust the insert's installation depth is unduly time consuming. This has been a particular problem when a large number of inserts have to be installed at a variety of depths.

Another approach has also been used previously, with equal difficulty. A stop collar has been used to limit the distance the mandrel could travel and thereby set the depth to which the helical coil insert could be installed. A set screw secured the collar in a selected position on the mandrel, but the collar would often slide up or down the mandrel after repeated use, because of vibrational forces and the force of the collar jamming against the tool body.

It should therefore be appreciated that there is a need for an installation tool for helical coil inserts that quickly and conveniently allows the adjustment and setting of insertion depths. In particular, there is a need for a tool that can be adjusted without having to disengage the mandrel from the tool body, without having to maintain an inventory of a number of different-length sleeves, without having to retighten a stop collar that loosens due to vibration and jamming, and without having to substantially disassemble the entire tool. The present invention fulfills this need.

SUMMARY OF THE INVENTION

The present invention is embodied in a tool for installing helical coil inserts into tapped holes in a workpiece, the tool being quickly and conveniently adjustable to control the depth to which each insert is installed. The tool includes a tubular tool body having a threaded opening extending along its axis and having means at its leading end for carrying a helical coil insert, in alignment with the threaded opening. A mandrel is located in the threaded opening for engagement with the insert, and driving means applies a torque to the mandrel sufficient to install the insert into a tapped hole. In accordance with the invention, the tool further includes a sleeve threadedly received in the threaded opening of the tubular body, encircling the mandrel. The sleeve is engaged by an annular shoulder on the driving means, to prevent further advancement of the driving means and mandrel and thereby limit the depth to which the insert is installed in the tapped hole. The insertion depth can be adjusted quickly and conveniently, without requiring any removal of the mandrel from the tool body, by controllably threading the sleeve into or out of the tool body.

In other, more detailed aspects of the invention, the sleeve has two flats interrupting the threads, on opposite sides of the sleeve. A set screw threaded through the tubular body can be tightened against one of the flats to secure the sleeve's position within the tool body. The exposed upper end of the sleeve is slotted so that a spanner wrench can grip and threadedly turn the sleeve into or out of the tool body. The slots can be aligned with the flats, to indicate the flats' circumferential locations on the sleeve.

Other features and advantages of the present invention should become apparent from the following description of the preferred embodiment, taken in conjunction with accompanying drawings, which illustrate, by way of example, the principles of the invention.

DESCRIPTION OF THE PREFERRED EMBODIMENT

Figure 1:
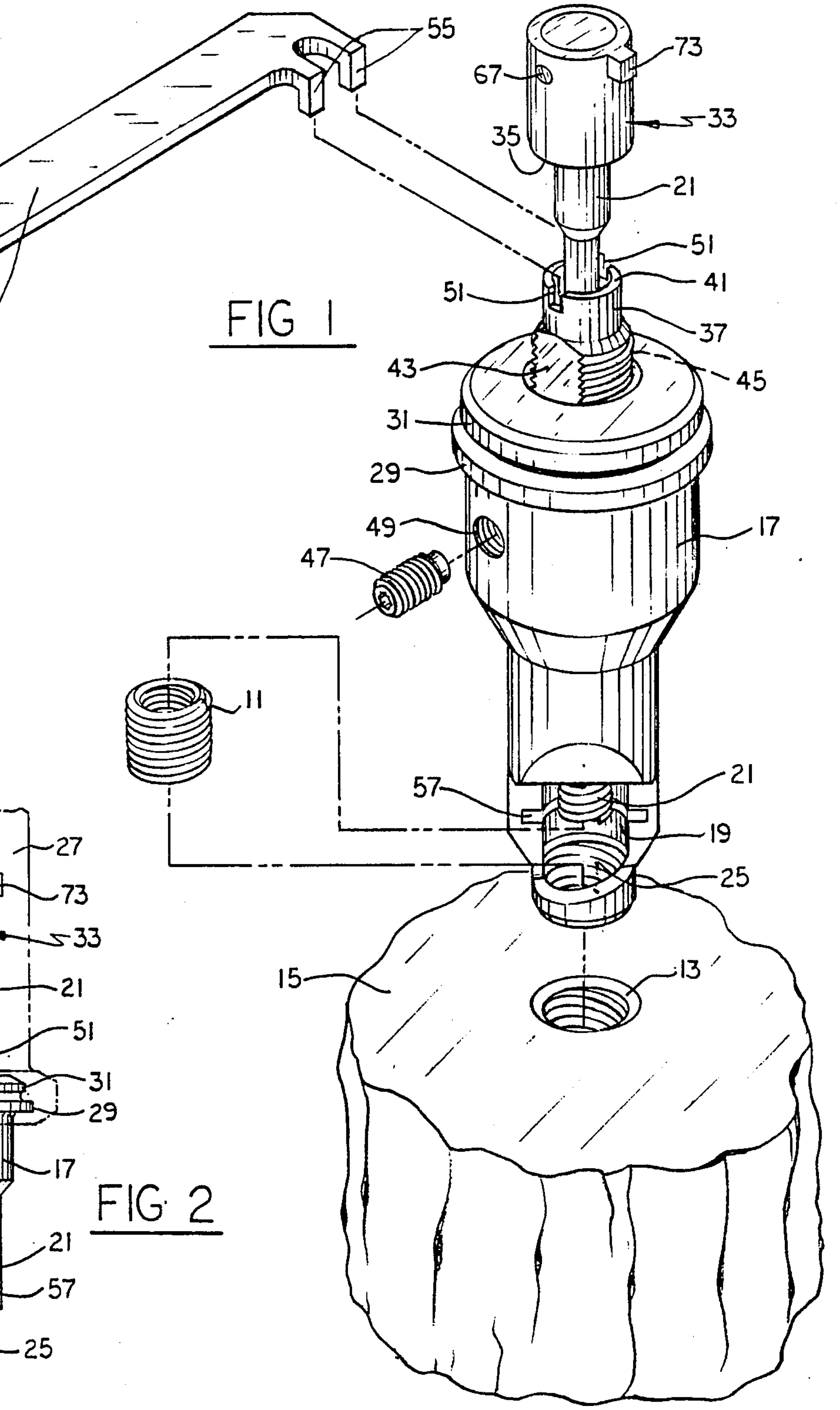
FIG. 1 is a perspective view of the preferred embodiment of a tool for installing a helical coil insert into a tapped hole in a workpiece.

With reference now to the drawings there is shown a tool for use in installing a helical coil insert 11 into a tapped hole 13 in a workpiece 15. The tool includes a tubular tool body 17 having an opening 18 extending axially through its entire length. An insert is carried in a recess 19 formed adjacent the body's leading end and coaxial with the body's opening 18. An elongated, threaded mandrel 21 engages threads 23 (FIGS. 4–6) in the body opening, immediately adjacent the insert recess, such that rotation of the mandrel relative to the body advances the mandrel's leading end into engagement with the insert. Further rotation of the mandrel forces the insert through a threaded compression section or prewinder 25 of the tool body, which compresses the insert's diameter for threaded insertion into the tapped hole. After the insert has been installed to a predetermined depth, the mandrel is rotated in the reverse direction, to withdraw from the tapped hole. The insert expands into tight engagement with the hole and thereafter can serve as a hard surface for securely gripping the threads of a threaded fastener, e.g., a screw (not shown).

The mandrel 21 is rotatably driven by an air motor that includes an adapter portion 27 (FIG. 2) coupled to the tool body's trailing end. The adapter's leading end is secured to the tool body 17 by a nut 28 that grasps two annular flanges 29 and 31 projecting outwardly from the body. A clutch assembly 33 is interposed between the air motor and the mandrel's trailing end, for coupling torque to the mandrel 21. Rotation of the motor thus threads the mandrel downwardly through the tool body, until the mandrel's leading end engages the insert 11 and threads it through the prewinder 25 into the tapped hole 13. The clutch assembly has a diameter larger than that of the mandrel, such that its lower end forms an annular shoulder 35.

In accordance with the invention, the installation tool further includes a sleeve 37 encircling the mandrel 21 and threaded into an upper section 39 of the tool body's opening 18. An upper annular shoulder 41 of the sleeve is positioned to be engaged by the shoulder 35 of the clutch assembly 33, which limits further advancement downwardly of the clutch assembly. After a few additional turns, the clutch assembly ceases to couple the motor's rotation to the mandrel and further threading of the insert 11 into the tapped hole 13 likewise ceases. Operation of the clutch assembly is described more fully below.

Figure 3:
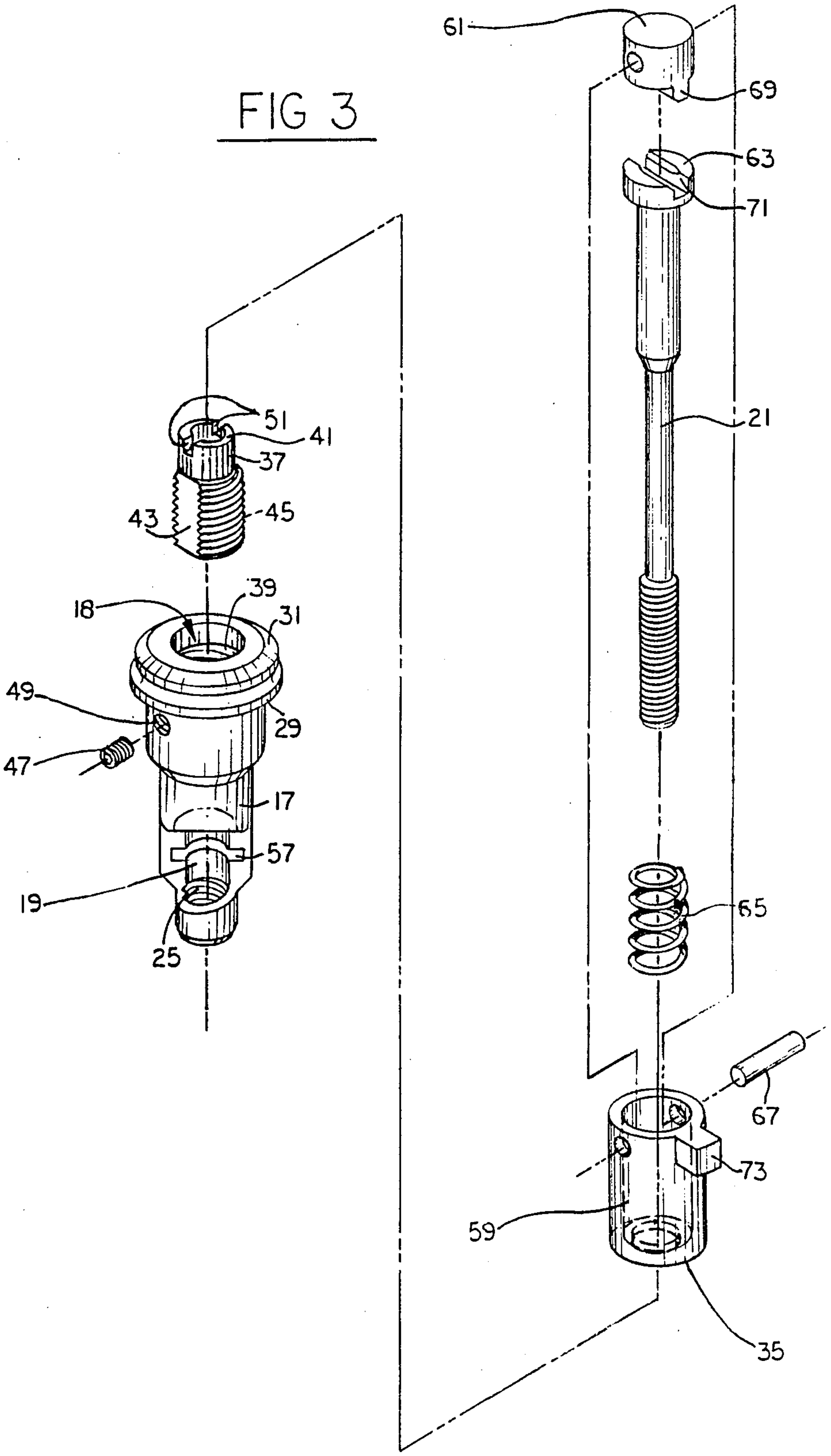
FIG. 3 is an exploded perspective view of the installation tool.

As shown in FIG. 3, the adjusting sleeve 37 includes threads on its exterior surface, to be threadable into or out of the tool body 17. This exterior threading is interrupted by two flats 43 and 45 directly opposite each other, for use in locking the sleeve in a selected position to the tool body. A set screw 47 is threaded through a threaded opening 49 in the body to abut against one of the sleeve's two flats. This prevents the sleeve from rotating and thereby locks it in place.

The adjusting sleeve 37 further includes wrenching slots 51 on its upper or trailing end, for engagement by a spanner wrench 53 (FIG. 1). The wrench includes protruding fingers 55 for gripping the slots and enabling the sleeve to be threaded to a preferred position. The slots are preferably aligned with the flats 43 and 45, to provide a visible indication of the flats' circumferential location relative to the set screw 47 and threaded opening 49.

Threading the adjusting sleeve 37 inwardly or outwardly relative to the tool body 17 provides the installation tool its variability in setting the depth of the helical coil insert 11 to be positioned within the tapped hole 13. To the extent that the sleeve rises above the tool body's upper end, the distance the mandrel can travel through the body is limited. This limits the depth that the insert will be set within the tapped hole. This adjustability is illustrated in FIGS. 4–6, which depict three exemplary depth settings, A, B and C, respectively.

Figure 4:
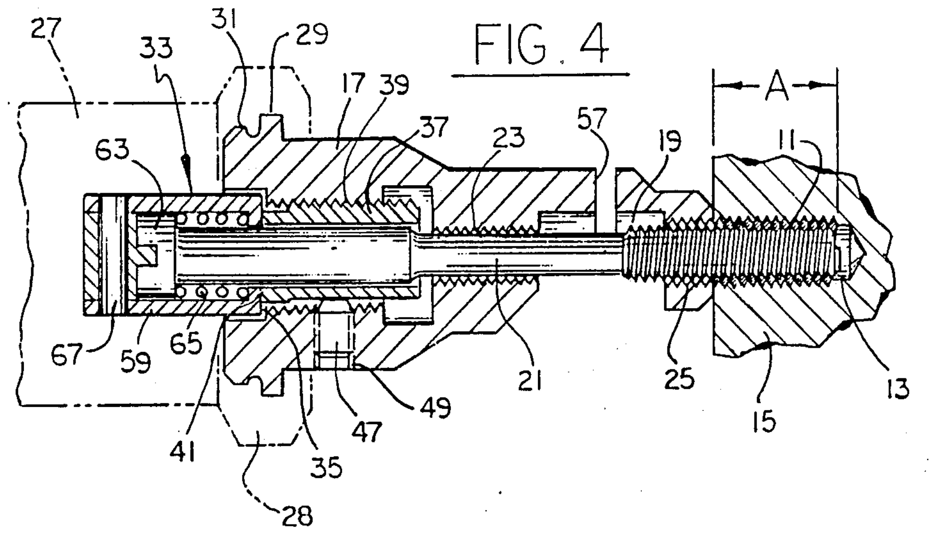
FIG. 4 is an enlarged sectional view of the installation tool, with the adjusting sleeve in its most inward position, resulting in the helical coil insert being installed to a maximum depth.

In FIG. 4, the adjusting sleeve 37 is positioned in its most retracted position, i.e., almost entirely within the tool body 17. The clutch assembly 33 is depicted with its shoulder 35 in contact with the sleeve's shoulder 41. The resulting insertion depth A of the helical coil insert 11 in the tapped hole 13 of the workpiece 15 is the deepest the installation tool can provide.

Figure 5:
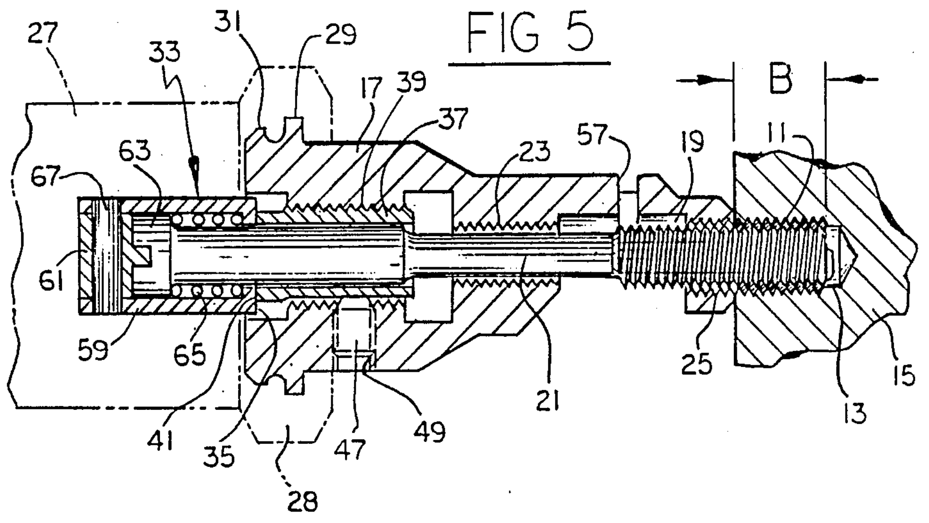
FIG. 5 is an enlarged sectional view of the installation tool, with the adjusting sleeve in an extended position from that of FIG. 4, resulting in the helical coil insert being installed to an intermediate depth.

In FIG. 5, the adjusting sleeve 37 is retracted from its FIG. 4 position such that the clutch assembly's shoulder 35 engages the sleeve's shoulder 41 sooner. The mandrel 21 is therefore not advanced as far as it was in FIG. 4, and the helical coil insert's insertion depth B is correspondingly shallower than the insertion depth A of FIG. 4.

Figure 6:
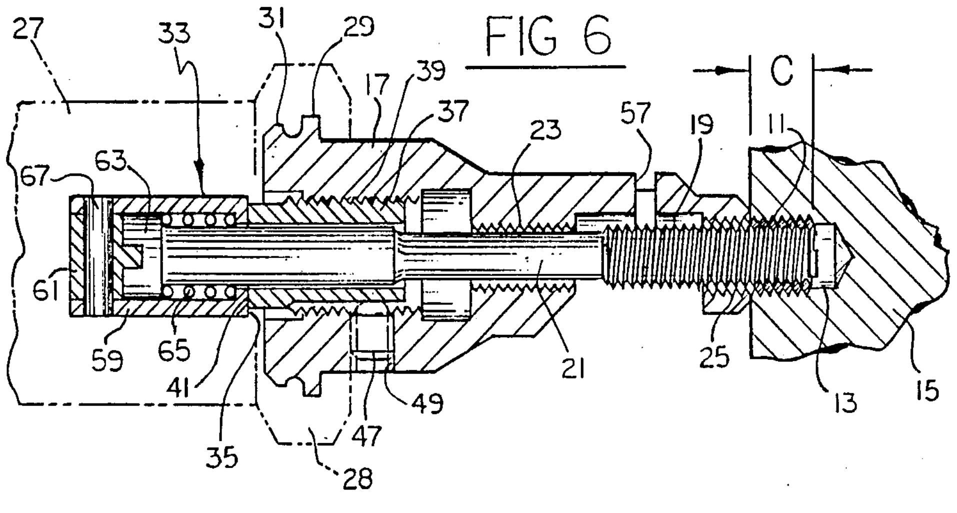
FIG. 6 is an enlarged sectional view of the installation tool, with the adjusting sleeve in an even further extended position from that of FIGS. 4 and 5, resulting in the helical coil insert being installed to a relatively shallow depth.

In FIG. 6, the adjusting sleeve 37 is retracted even further from the positions of FIGS. 4 and 5. The mandrel 21 can therefore be advanced by the air motor only a short distance, and the helical coil insert's insertion depth C is relatively shallow.

Figure 2:
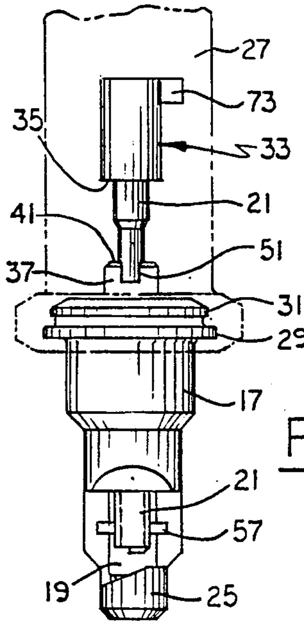
FIG. 2 is a side elevational view of the installation tool, with the front portion of an associated adaptor for an air motor being shown in phantom lines.

As shown in FIGS. 1–3, the recess 19 at the lower end of the tool body 17 is sized to permit a convenient placement of the helical coil insert 11. A slot 57 on the back side of the recess facilitates automatic loading of a series of inserts carried on a plastic strip (not shown), as is conventional. The empty strip exits through the slot, while the next succeeding insert is loaded into the recess.

As best shown in FIG. 3, the clutch assembly 33 includes a clutch sleeve 59, two clutch elements 61 and 63 contained within the clutch sleeve, and a compression spring 65 for urging the two clutch elements together. The first clutch element 61 is secured to the clutch sleeve by a transverse locking pin 67, and the second clutch element 63 is integral with the mandrel 21, forming its upper end. The respective clutch elements 61 and 63 include a mating tab 69 and notch 71, such that rotation of the first element is positively coupled to the second element.

In operation, the air motor rotatably drives the clutch sleeve 59, in a first direction, e.g., clockwise, via a tab 73 projecting from the sleeve's side. This rotates the first clutch element 61 and, in turn the second clutch element 63, which is urged into engagement with the first element by the compression spring 65. Since the second clutch element is integral with the mandrel 21, this rotation threadedly advances the mandrel relative to the threaded section 23 of the tool body opening 18.

Eventually, the mandrel's leading end engages the helical coil insert 11 and rotatably drives it through the prewinder 25 and into the tapped hole 13. The mandrel will disengage from the threaded section 23 of the tool body at a point during the installation procedure; however, the mandrel continues to advance relative to the tool body because it and the insert are then threadedly engaged with the tapped hole.

When the shoulder 35 on the lower end of the clutch sleeve 59 finally reaches the shoulder 41 of the upper end of the adjusting sleeve 37, further axial advancement of the clutch sleeve is prevented. Further rotation of the clutch sleeve and first clutch element 61 continues to advance the second clutch element 63 and the mandrel 21, however, until the tab 69 and notch 71 of the respective clutch elements move out of engagement with each other. Thereafter, no further advancement of the mandrel can occur, and installation of the insert in the tapped hole is complete. Conventional air motors are designed to reverse rotation directions automatically when this has been accomplished. This withdraws the mandrel from the installed insert 11 by rotating in a second or reverse direction, e.g., counterclockwise.

It should be appreciated from the foregoing description that the present invention provides an improved tool for use in automatically installing a helical coil insert to a selected depth in a tapped hole. A special adjusting sleeve is threaded to a selected position in a tubular tool body to serve as a stop preventing further advancement of a mandrel that forces the insert into the tapped hole. The sleeve's position can be conveniently and precisely threaded into or out of the tool body, to adjust the insertion depth without requiring any disassembly of the mandrel from the tool body.

Although the invention has been described in detail with reference to the preferred embodiment, those skilled in the art will appreciate that various modifications can be made without departing from the invention. Accordingly, the invention is defined only by the following claims.

I claim:

1. A tool for inserting a helical coil insert in a tapped hole formed in a workpiece, the tool comprising:

a tubular tool body having a threaded opening extending along its axis and having means at one end for carrying a helical coil insert in a fixed position, in alignment with the threaded opening;

a mandrel located in the threaded opening of the tool body and adapted to be moved a fixed distance from a predetermined retracted position, in which it is retracted from the helical coil insert, to a predetermined engagement position, in which it first engages the helical coil insert, and to be moved a selectable distance to a selected installation position, in which the helical coil insert is installed to a selected depth in the tapped hole of the workpiece;

driving means for applying a torque to the mandrel sufficient to move it from its predetermined retracted position to its predetermined engagement position to its selected installation position, wherein the driving means is connected to the mandrel at the end of the mandrel opposite the helical coil insert, and wherein the driving means includes a shoulder; and a sleeve threadedly received and selectively positioned in the threaded opening of the tool body, the sleeve being configured to be engaged by the shoulder of the driving means and prevent further advancement of the driving means and mandrel, thereby defining the selected installation position of the mandrel and limiting the depth to which the helical coil insert is installed in the tapped hole, and wherein the tool body and sleeve are configured such that the sleeve can be controllably threaded without requiring any disassembly of the mandrel from the tool body.

2. A tool as defined in claim 1, wherein the sleeve includes a notched end to facilitate an adjustment of its position relative to the tool body using a suitable spanner wrench.

3. A tool as defined in claim 1, wherein:

the sleeve includes exterior threads and a flat area interrupting the exterior threads;

the tool further includes a threaded, radially-aligned opening in the tool body, and a set screw threadedly received in the radially-aligned opening of the tool body, rotation of the set screw bringing it into contact with the flat area of the sleeve, to lock the sleeve in a preferred position within the tool body.

4. A tool as defined in claim 3, wherein the sleeve includes a trailing end having a slot formed in it, in circumferential alignment with the flat area, the slot facilitating a threaded positioning of the sleeve relative to the tool body and further providing a visible indication of the flat area's circumferential location on the sleeve.

5. A tool for inserting a helical coil insert in a tapped hole formed in a workpiece, the tool comprising:

an elongated tubular tool body having an opening extending axially through its entire length, the opening including a first threaded section and a second threaded section, the tool body further including means at one end for carrying a helical coil insert in a fixed position, in alignment with the opening, and means defining a threaded, radially-aligned opening extending from the tool body's exterior surface to the second threaded section;

a mandrel located in the opening of the tool body and having a threaded section adapted to threadedly engage the first threaded section of the opening and having a leading end adapted to engage the helical coil insert;

wherein the mandrel is adapted to be moved a fixed distance from a predetermined retracted position, in which it is retracted from the helical coil insert, to a predetermined engagement position, in which it first engages the helical coil insert, and a selectable distance to a selected installation position, in which the helical coil insert is installed to a selected depth in the tapped hole of the workpiece;

driving means for applying a torque to the mandrel sufficient to move it from its predetermined retracted position to its predetermined engagement position to its selected installation position, the driving means being connected to the mandrel at the end of the mandrel opposite the leading end and including a shoulder;

a sleeve encicling a portion of the mandrel and having exterior threads adapted to threadedly engage the second threaded section of the tool body opening, the exterior threads being interrupted by a flat area;

wherein the sleeve includes an annular shoulder configured to be engaged by the shoulder of the driving means and prevent further advancement of the driving means and mandrel, thereby limiting the depth to which the helical coil insert is installed in the tapped hole;

wherein the sleeve is controllably threadable into or out of the tool body, to adjust the position at which the sleeve prevents further advancement of the driving means and mandrel and thereby define the selected installation position of the mandrel; and a set screw threadably received in a radially-aligned opening of the tool body, rotation of the set screw bringing it into contact with the flat area of the sleeve, to lock the sleeve in a preferred position within the tool body.

6. A tool as defined in claim 5, wherein the sleeve includes a trailing end having a slot formed in it, in circumferential alignment with the flat area, the slot facilitating a threaded positioning of the sleeve relative to the tool body and further providing a visible indication of the flat area's circumferential location on the sleeve.

7. A tool for inserting a helical coil insert in a tapped hole formed in a workpiece, the tool comprising:

a tubular tool body having a threaded opening extending along its axis and having means at one end for carrying a helical coil insert in alignment with the threaded opening;

a mandrel located in the threaded opening of the tool body and adapted to engage the helical coil insert;

driving means for applying a torque to the mandrel sufficient to install the helical coil insert into the tapped hole, wherein the driving means is connected to the mandrel at the end of the mandrel opposite the helical coil insert, and wherein the driving means includes a shoulder;

a sleeve threadedly received in the threaded opening of the tool body, the sleeve being configured to be engaged by the shoulder of the driving means and prevent further advancement of the driving means and mandrel, thereby limiting the depth to which the helical coil insert is installed in the tapped hole, wherein the sleeve is controllably threadable into or out of the tool body, to 'change the position at which it prevents further advancement of the driving means and mandrel, wherein the tool body and sleeve are configured such that the sleeve can be controllably threaded without requiring any disassembly of the mandrel from the tool body, wherein the sleeve includes exterior threads and a flat area interrupting the exterior threads, and wherein the sleeve includes a trailing end having a slot formed in it, in circumferential alignment with the flat area, the slot facilitating a threaded positioning of the sleeve relative to the tool body and further providing a visible indication of the flat area's circumferential location of the sleeve;

a threaded, radially aligned opening in the tool body; and a set screw threadedly received in the radially-aligned opening of the tool body, rotation of the set screw bringing it into contact with the flat area of the sleeve, to lock the sleeve in a preferred position within the tool body.

8. A tool for inserting a helical coil insert in a tapped hole formed in a workpiece, the tool comprising:

an elongated tubular tool body having an opening extending axially through its entire length, the opening including a first threaded section and a second threaded section, the tool body further including means at one end for carrying the helical coil insert in alignment with the opening and means defining a threaded, radially-aligned opening extending from the tool body's exterior surface to the second threaded section;

a mandrel located in the opening of the tool body and having a threaded section adapted to threadedly engage the first threaded section of the opening and having a leading end adapted to engage the helical coil insert;

driving means for applying a torque to the mandrel sufficient to install the helical coil insert into the tapped hole, the driving means being connected to the mandrel at the end of the mandrel opposite the leading end and including a shoulder;

a sleeve encircling a portion of the mandrel and having exterior threads adapted to threadedly engage the second theaded section of the tool body opening, the exterior threads being interrupted by a flat area, wherein the sleeve includes an annular shoulder configured to be engaged by the shoulder of the driving means and prevent further advancement of the driving means and mandrel, thereby limiting the depth to which the helical coil insert is installed in the tapped hole, wherein the sleeve is controllably threadable into or out of the tool body, to adjust the position at which the sleeve prevents further advancement of the driving means and mandrel, wherein the sleeve includes a trailing end having a slot formed in it, in circumferential alignment with the flat area, the slot facilitating a threaded positioning of the sleeve relative to the tool body and further providing a visible indication of the flat area's circumferential location on the sleeve; and a set screw threadably received in the radially aligned opening of the tool body, rotation of the set screw bringing it into contact with the flat area of the sleeve, to lock the sleeve in a preferred position within the tool body.

* * * * *